США 010217200B2

United States Patent
Wu et al.

(10) Patent No.: US 10,217,200 B2
(45) Date of Patent: Feb. 26, 2019

(54) JOINT VIDEO STABILIZATION AND ROLLING SHUTTER CORRECTION ON A GENERIC PLATFORM

(71) Applicant: Microsoft Technology Licensing, LLC, Redmond, WA (US)

(72) Inventors: Yongjun Wu, Bellevue, WA (US); Matthew Wozniak, Redmond, WA (US); Simon Baker, Palo Alto, CA (US); Catalin Alexandru Negrila, Redmond, WA (US); Venkata S. K. Kamal Lanka, Sammamish, WA (US); Kevin Chin, Seattle, WA (US); Brian Kohlwey, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 110 days.

(21) Appl. No.: 15/284,524

(22) Filed: Oct. 3, 2016

(65) Prior Publication Data
US 2017/0236257 A1   Aug. 17, 2017

Related U.S. Application Data

(63) Continuation of application No. 13/440,993, filed on Apr. 6, 2012, now Pat. No. 9,460,495.

(51) Int. Cl.
| | |
|---|---|
| *G06T 5/10* | (2006.01) |
| *G06T 5/00* | (2006.01) |
| *G06T 5/50* | (2006.01) |
| *H04N 5/232* | (2006.01) |
| *G06T 3/00* | (2006.01) |
| *G06T 7/20* | (2017.01) |

(52) U.S. Cl.
CPC .............. *G06T 5/10* (2013.01); *G06T 3/0093* (2013.01); *G06T 5/006* (2013.01); *G06T 5/50* (2013.01); *G06T 7/20* (2013.01); *H04N 5/2329* (2013.01); *H04N 5/23254* (2013.01); *H04N 5/23267* (2013.01); *G06T 2207/10016* (2013.01); *G06T 2207/20016* (2013.01)

(58) Field of Classification Search
CPC ....................................................... G06T 5/10
See application file for complete search history.

(56) References Cited

U.S. PATENT DOCUMENTS

| | | | |
|---|---|---|---|
| 6,195,389 B1 * | 2/2001 | Rodriguez | H04N 19/51 375/240.16 |
| 6,924,832 B1 * | 8/2005 | Shiffer | G06T 7/248 348/36 |

(Continued)

OTHER PUBLICATIONS

"Final Office Action Issued in U.S. Appl. No. 13/440,993", dated Feb. 10, 2015, 13 Pages.

(Continued)

*Primary Examiner* — Tracy Y. Li
(74) *Attorney, Agent, or Firm* — Holzer Patel Drennan

(57) ABSTRACT

In one embodiment, a video processing system 300 may filter a video data set to correct skew and wobble using a central processing unit 220 and a graphical processing unit 230. The video processing system 300 may apply a rolling shutter effect correction filter to an initial version of a video data set. The video processing system 300 may simultaneously apply a video stabilization filter to the initial version to produce a final version video data set.

19 Claims, 6 Drawing Sheets

(56) References Cited

U.S. PATENT DOCUMENTS

| | | | |
|---|---|---|---|
| 7,642,741 | B2 | 1/2010 | Sidman |
| 2002/0099829 | A1* | 7/2002 | Richards .......... G06F 17/30899 709/227 |
| 2006/0018381 | A1* | 1/2006 | Luo ..................... H04N 5/145 375/240.16 |
| 2006/0165181 | A1 | 7/2006 | Kwan et al. |
| 2006/0220632 | A1 | 10/2006 | Koo |
| 2007/0002146 | A1* | 1/2007 | Tico ..................... G06T 5/50 348/208.1 |
| 2007/0147706 | A1 | 6/2007 | Sasaki et al. |
| 2009/0160957 | A1 | 6/2009 | Deng et al. |
| 2010/0182511 | A1 | 7/2010 | Xu |
| 2010/0265357 | A1* | 10/2010 | Liu ..................... G06T 5/50 348/223.1 |
| 2010/0317420 | A1* | 12/2010 | Hoffberg ............ G06Q 30/0207 463/1 |
| 2011/0034176 | A1 | 2/2011 | Lord et al. |
| 2011/0085218 | A1 | 4/2011 | Bernal et al. |
| 2011/0122265 | A1 | 5/2011 | Oryoji |
| 2011/0176014 | A1 | 7/2011 | Hong et al. |
| 2011/0176043 | A1 | 7/2011 | Baker et al. |
| 2011/0193978 | A1 | 8/2011 | Wu et al. |
| 2011/0211082 | A1 | 9/2011 | Forssen et al. |
| 2011/0221896 | A1 | 9/2011 | Haddick et al. |
| 2011/0249742 | A1* | 10/2011 | Price ..................... H04N 19/46 375/240.16 |
| 2011/0267514 | A1 | 11/2011 | D'Angelo et al. |
| 2012/0039387 | A1 | 2/2012 | Ha et al. |
| 2012/0242847 | A1 | 9/2012 | Narita |
| 2012/0254727 | A1 | 10/2012 | Jain et al. |
| 2013/0073964 | A1 | 3/2013 | Meaney et al. |
| 2013/0188069 | A1* | 7/2013 | Sendik ................ H04N 5/217 348/222.1 |

OTHER PUBLICATIONS

"Non Final Office Action Issued in U.S. Appl. No. 13/440,993", dated Nov. 13, 2015, 12 Pages.

"Non Final Office Action Issued in U.S. Appl. No. 13/440,993", dated Aug. 18, 2014, 12 Pages.

"Notice of Allowance Issued in U.S. Appl. No. 13/440,993", dated Jun. 2, 2016, 5 Pages.

Forssen, et al., "Rectifying Rolling Shutter Video From Hand-Held Devices", In Proceedings of IEEE Conference on Computer Vision and Pattern Recognition, Jun. 13, 2010, pp. 507-514.

Karpenko, et al., "Digital Video Stabilization and Rolling Shutter Correction using Gyroscopes", IIn Stanford Technical Report CTSR 2011-03, Mar. 2011, 7 Pages.

"International Search Report and Written Opinion Issued in PCT Patent Application No. PCT/US2013/034512", dated Jul. 11, 2013, 12 Pages.

* cited by examiner

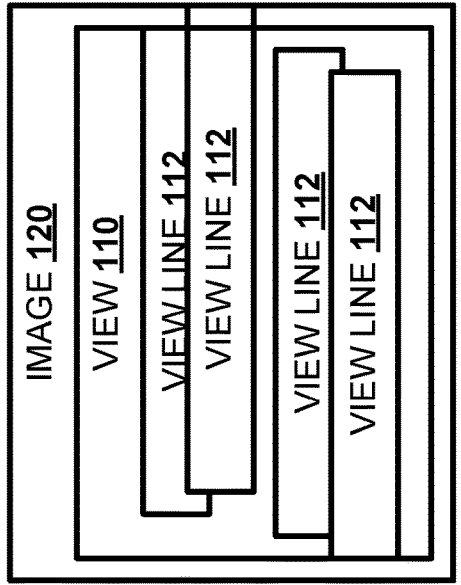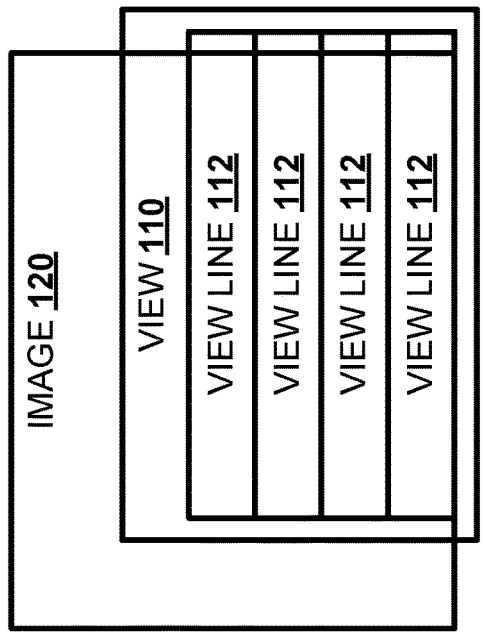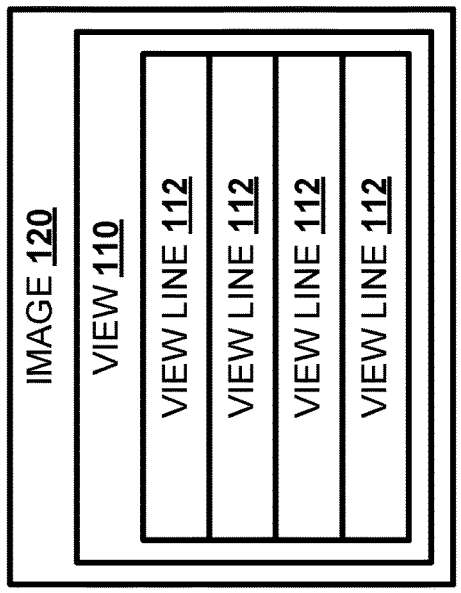

| CACHE 402 | | | | |
|---|---|---|---|---|
| INITIAL VERSION 404 | PREVIEW PROXY 408 | PREVIEW PROXY 408 | PREVIEW PROXY 408 | FINAL VERSION 414 |
| | PARAMETER (OFF) 412 | PARAMETER (LOW) 412 | PARAMETER (HIGH) 412 | PARAMETER 418 |
| INITIAL STATE MACHINE 406 | PROXY LOAD STATUS STATE MACHINE 410 | PROXY LOAD STATUS STATE MACHINE 410 | PROXY LOAD STATUS STATE MACHINE 410 | FINAL STATE MACHINE 416 |

JOINT VIDEO STABILIZATION AND ROLLING SHUTTER CORRECTION ON A GENERIC PLATFORM

PRIORITY INFORMATION

This application claims priority from U.S. patent application Ser. No. 13/440,993, filed Apr. 6, 2012, the contents of which are incorporated herein by reference in its entirety.

BACKGROUND

Many users may shoot home video using handheld digital cameras, such as camcorders, digital single lens reflex cameras, point-and-shoot cameras and camera phones. The users may shoot these home videos from an unstable, moving position rather than a steady viewpoint, such as mounted on a tripod. This technique may create a video that visibly shakes, even inducing nausea in watchers who view the home video for extended periods of time. Additionally, as many digital video cameras capture an image on a line by line basis, a digital video camera may produce a "rolling shutter effect" due to movement of the camera while filming.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to a video processing system that filters a video data set to correct skew and wobble using a central processing unit and a graphical processing unit. The video processing system may apply a rolling shutter effect correction filter to an initial version of a video data set. The video processing system may simultaneously apply a video stabilization filter to the initial version to produce a final version video data set.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIGS. 1a-c illustrate, in a block diagram, multiple embodiments of a digital image capture.

FIG. 4 illustrates, in a block diagram, one embodiment of a load status tracking machine.

DETAILED DESCRIPTION

Figure 2:
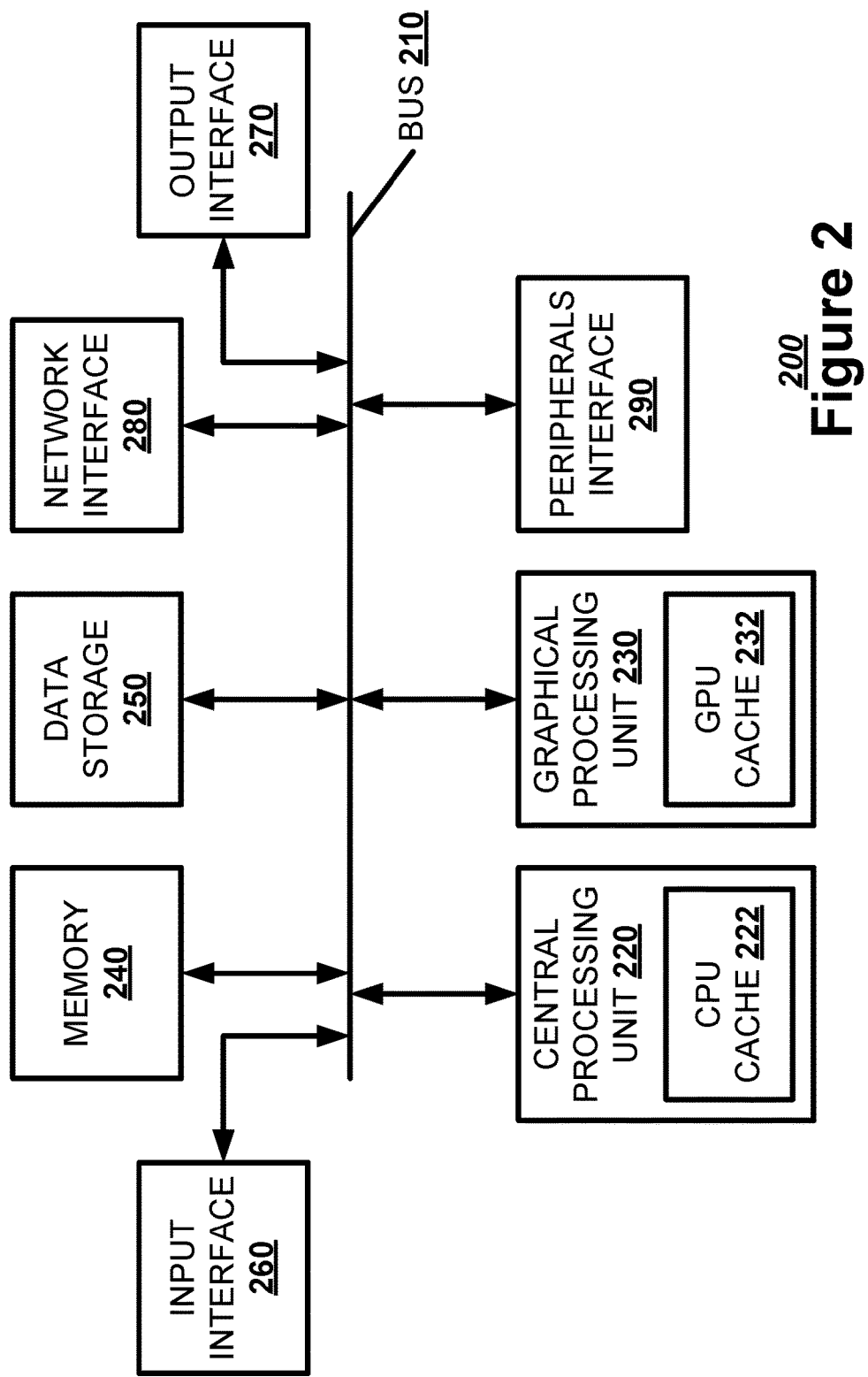
FIG. 2 illustrates, in a block diagram, one embodiment of a computing device.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or a video processing system.

Many video editing applications may feature video stabilization. Video stabilization may cause other visual artifacts to become more noticeable without the distraction of the global shaking. One such detrimental effect may be rolling shutter effect, produced by the "rolling" shutter in most digital cameras. The shutter may capture each frame one line at a time, rather than capturing the entire frame simultaneously. Different parts of the same objects may appear in different places in the frame due to the time delay during capture. These visual effects may give an unnatural feel to the video and a nauseating sensation to the viewer.

A video processing system may filter an initial version of a video data set to produce a more watchable final version of the video data set correcting skew and wobble in the initial version. The video processing system may be part of computing device or may be integrated into the camera. An initial version of the video data set is the video data set prior to any correction processing. A final version of the video data set is the video data set after the correction processing has been completed. The video processing system may distribute the filtering process between a central processing unit (CPU) and a graphical processing unit (GPU) to provide a faster and more efficient performance.

Thus, in one embodiment, a video processing system may filter a video data set to correct skew and wobble using a central processing unit and a graphical processing unit. The video processing system may apply a rolling shutter effect correction filter to an initial version of a video data set. The video processing system may simultaneously apply a video stabilization filter to the initial version to produce a final version video data set.

FIG. 1a illustrates, in a block diagram, one embodiment of a preceding image capture 100. A digital video frame is a complete digital image representing a single moment in time. The moment in time may encompass the amount of time to capture data for each pixel in the image. The preceding image capture 100 may capture a view 110 in an image 120. The view 110 is the area the digital camera is trying to capture. The image 120 is the area the digital camera is actually capturing. A digital camera may acquire a view 110 by moving, or "rolling", a shutter across the light sensors to capture a single view line 112 at a time. The shutter may be mechanical or electronic. The light sensors may be complementary metal oxide semiconductor (CMOS) sensors. While each view line 112 of a view 110 may capture at different times, the whole view 110 may shown at the same time during playback. Even a user with extremely steady hands may produce different negative visual effects on a moving image.

FIG. 1b illustrates, in a block diagram, one embodiment of an image capture movement 130. A user may cause an image capture movement 130 by moving the digital camera between digital video frames. As shown in FIG. 1b, the view 110 is askew within the image 120. As this effect may produce nausea in many viewers, many amateur videographers may seek to have this effect removed. A video processing system may correct image capture movement through a video stabilization process.

FIG. 1c illustrates, in a block diagram, one embodiment of an image capture distortion 160. A user may cause an image capture distortion 160 by moving the digital camera between view line 112 captures. Examples of an image capture distortion 160 may be a skew, a wobble, or a smear. A skew describes a bend in the image caused by a camera movement in between capturing view lines 112 in a single view 110. A wobble describes an unnatural movement of a solid object in the view 110. A smear describes a distortion or elongation of an object in the view 110. A video processing system may correct an image capture distortion through a rolling shutter effect correction process.

FIG. 2 illustrates a block diagram of an exemplary computing device 200 which may act as a video processing system. The computing device 200 may combine one or more of hardware, software, firmware, and system-on-a-chip technology to implement a video processing system. The computing device 200 may include a bus 210, a central processor unit 220, a graphical processing unit 230, a memory 240, a data storage 250, an input interface 260, an output interface 270, a network interface 280, and a peripherals interface 290. The bus 210, or other component interconnection technology, may permit communication among the components of the computing device 200.

The central processing unit 220 may include one or more conventional processors or microprocessors that interpret and execute a set of instructions. A central processing unit cache 222 may store temporary variables or other intermediate information used during execution of instructions by the central processing unit 220. The graphical processing unit 230 may also include one or more conventional processors or microprocessors that interpret and execute a set of instructions, specializing in executing processing of graphical data, such as images and video. A graphical processing unit cache 232 may store temporary variables or other intermediate information used during execution of instructions by the graphical processing unit 230.

The memory 240 may be a random access memory (RAM) or another type of dynamic storage device that stores information and instructions for execution by the central processing unit 220 or the graphical processing unit 230. The data storage 250 may include any type of tangible machine-readable medium, such as, for example, magnetic or optical recording media and its corresponding drive. A tangible machine-readable medium is a physical medium storing machine-readable code or instructions, as opposed to a transitory medium or signal. The data storage 250 may store a set of instructions detailing a method that when executed by one or more processors cause the one or more processors to perform the method. The storage device 250 may also be a database or a database interface for storing video data sets.

The input interface 260 may include one or more conventional mechanisms that permit a user to input information to the computing device 200, such as a keyboard, a mouse, a voice recognition device, a microphone, a headset, a touchscreen, etc. The output interface 270 may include one or more conventional mechanisms that output information to the user, including a display, a printer, one or more speakers, a headset, or a medium, such as a memory, or a magnetic or optical disk and a corresponding disk drive. The network interface 280 may include any transceiver-like mechanism that enables computing device 200 to communicate with other devices or networks. The network interface 280 may be a wireless, wired, or optical interface. The peripherals interface 290 may connect the computing device 200 to peripheral devices, such as a portable data drive, a video camera, a digital single lens reflex camera, a camera phone, or other peripheral device.

The computing device 200 may perform such functions in response to the central processing unit 220 or the graphical processing unit executing sequences of instructions contained in a computer-readable medium, such as, for example, the memory 240, a magnetic disk, or an optical disk. Such instructions may be read into the memory 240 from another computer-readable medium, such as the data storage 250, or from a separate device via the network interface 280.

Figure 3:
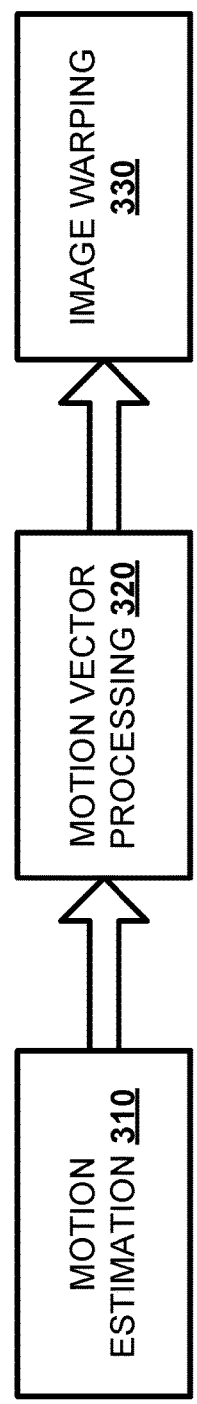
FIG. 3 illustrates, in a block diagram, one embodiment of a video processing system.

FIG. 3 illustrates, in a block diagram, one embodiment of a video processing system 300. The video processing system 300 may simultaneously apply a rolling shutter effect correction filter and a video stabilization filter to a video data set. The video processing system 300 may distribute the processing tasks between the central processing unit 220 and the graphical processing unit 230 to optimize filtering of the video data set. The video processing system 300 may have a motion estimation module 310, a motion vector processing module 320, and an image warping module 330. The motion estimation module 310 may perform the down sampling to create a motion vector set. The motion vector processing module 320 may perform the optical flow estimation on the down-sampled frames. The image warping module 330 may apply the motion vector set to the video data set to correct for rolling shutter effect and stabilize the video data set. The video processing system 300 may apportion the filtering tasks between a central processing unit 220 and a graphical processing unit 230 based on prior filtering performance. The central processing unit 220 or the graphical processing unit 230 may execute the apportionment.

The motion estimation module 310 may create a down sample set of the video data set to determine the optical flow between successive down-sampled frames. The down sample frames may have a resolution of 320×240, 240×180, or 160×120. The rolling shutter effect correction filter or the video stabilization filter may disregard certain motion vectors from a dense optical flow. A rolling shutter effect correction filter may disregard motion vectors on any of the four borders. The rolling shutter effect correction filter may sub-sample the motion vectors in each row. The rolling shutter effect correction filter may then use one motion vector, such as the median value of motion vectors per row, for rolling shutter effect estimation. The video stabilization filter may select a certain number of motion vectors from the dense optical flow motion vectors. Similarly, the video stabilization filter may disregard motion vectors on any of the four borders and may proportionally sub-sample horizontal and vertical directions to get a set number of motion vectors from one frame.

The motion vector processing module 320 may process the motion vectors to detect the shaky global motion for video stabilization and row motions from rolling shutter effect. The video stabilization filter may use a similarity model with 4 unknowns for shaky global motion, such as horizontal translation, vertical translation, rotation and scaling. The video stabilization filter may estimate global motion by executing spatial global motion estimation and iterative temporal smoothing of global motion. With the input of one motion vector per row in the down-sampled frame, the rolling shutter effect correction filter may solve a set of sub-sampled row motions through a smoothness constraint.

The motion estimation module 310 may further down-sample the previous down-sampled frames to construct a hierarchical pyramid. For example, starting from an input of 320×240, the hierarchy may be 320×240, 160×120, 80×60 or 40×30. The motion estimation module 310 may execute the down-sampling process recursively using a LeGall-Tabatabai (LGT) 5-3 low-pass filter, with the horizontal and vertical direction calculated separately. The filtering process may be represented by the equation:

Out[$n$]=0.25×In[$n$−1]+0.5×In[$n$]+0.25×In[$n$+1].

The motion estimation module may invoke a direct sub-sampling in the vertical direction without filtering when the input height is larger than a set threshold. The direct sub-sampling may be represented by the equation:

Out[$n$]=In[scale×$n$]

where "scale" is the down-sampling factor. Alternatively, the motion estimation module 310 may down-sample the video data set using bi-linear filtering or anisotropic-filtering supported by the graphical processing unit. The down-sampled frame may not match the predefined resolution for optical flow. The motion vector processing module 320 may execute image resizing to match the down-sampled frames.

The image warping module 330 may warp an image to correct row motions from rolling shutter effect correction and global motions from shaky movements to the video data set. In each level, the motion vector process module 320 may receive the down samples from the motion estimation module 310, execute residual computation using the warping image between successive pyramid frames, execute a Laplacian computation for the estimate motion flow, and construct and solve the linear optimization system using Gauss-Seidel successive over relaxation. The motion vector processing module 320 may execute a minimum number of iterations of this process at each level. First, the motion vector processing module 320 may compute the derivatives of the current frame, using the following equation:

$D_x[x,y]$=0.5×($C[x+1,y]−C[x−1,y]$)

$D_y[x,y]$=0.5×($C[x,y−1]−C[x,y−1]$)

where C [x, y] is the pixel in current frame. Second, the motion vector processing module 320 may execute bi-linear interpolation with the input of estimated optical flows Flow (x,y), as represented by the equation:

$Y[x,y]=\tilde{C}[x+Flow_x(x,y), y+Flow_y(x,y)]$ where $\tilde{C}[x Flow_x(x,y), y+Flow_y(x,y)]$ is the bi-linear interpolation from the input frame C[x, y]. Third, the motion vector processing module 320 may execute residual computation R [x, y] between a warped frame Y[x, y] and the previous reference frame P[x, y], such that $R[x,y]=Y[x,y]−P[x,y]$.

Fourth, the motion vector processing module 320 may execute a Laplacian computation of the optical flow, as represented by the equations:

$LFlow_x[x,y]$=4×$Flow_x[x,y]$−($Flow_x[x−1,y]+Flow_x[x+1,y]+Flow_x[x,y−1]+Flow_x[x,y+1]$)

$LFlow_y[x,y]$=4×$Flow_y[x,y]$−($Flow_y[x−1,y]+Flow_y[x+1,y]+Flow_y[x,y−1]+Flow_y[x,y+1]$).

Thus, the Laplacian computation of the optical flow may represent the difference between current position and the four direct neighbor positions in both horizontal and vertical directions. The motion vector processing module 320 may construct the linear system based on the input from the computed derivative, the residual computation, and the Laplacian computation. The motion vector processing module 320 may then solve the linear system using Gauss-Siedel successive over-relaxation with a few iterations and serial dependencies, altered to accommodate a graphical processing unit 230. The motion vector processing module 320 may then return to the bi-linear interpolation and repeat the process from that point.

The image warping module 330 may then up-sample the motion flow from a lower level using bi-linear interpolation and scaled up by a factor of 2, with the result acting as a seed for a next higher level. The video processing system 300 may repeat the process from the bi-linear interpolation until the original input down-sampled resolution is reached.

The video processing system 300 may execute a row motion estimation to act as a rolling shutter effect correction filter. The rolling shutter effect correction filter may estimate unknown row motion from rolling shutter effect by inputting optical flow, Flow[x, y], where [x, y] is the index in the down-sampled input frame in resolution [X, Y] for optical flow estimation. The rolling shutter effect correction filter may exclude motion vectors on any of the four borders with a border factor of β. On each row, the motion vector processing module 320 may sub-sample the motion vectors by a factor of α. The input values may be represented by $IN\_MV_{rsc}[i,n]=Flow[i, \alpha n]$, where n is in the range of $$\left[0, \frac{Y-2\beta}{\alpha}\right].$$

The rolling shutter effect correction filter may select the median motion vector $f_i$ on each row after sub-sampling as a single input motion vector on that row for rolling shutter effect estimation, as represented by:

$f_i$=median($IN\_MV_{rsc}[i,n]$).

The rolling shutter effect correction filter may sub-sample the unknown row motion vectors from rolling shutter effect, so that not each row motion is estimated. Instead, the rolling shutter effect correction filter may estimate γ row motion vectors on a given input resolution, where γ is a subset of the total number of rows. The rolling shutter effect correction filter may estimate unknown row motions using a least mean square error over-constrained optimization framework with a smoothness constraint, in a sliding window of size W. The optimization framework may minimize the following objective function:

min(Objective)=
  min($\Sigma_{Corr_{p,j}}\|MC(Corr_{k,j})\|^2+\lambda\Sigma_{p,j}\|v_{p,j}-v_{p,j=1}\|^2$), where p is the frame index in the sliding window and j is the sub-sampled row index within a frame, so that $v_{p,j}$ is the unknown row motion with horizontal and vertical components from rolling shutter effect. The second item in the equation describes the smoothness constraint of the unknown row motions. The first item in the equation describes the correspondence between optical flow and rolling shutter motion, as shown in the equation:

$\Sigma_{Corr_{p,j}}\|MC(Corr_j)\|^2=\Sigma_p\Sigma_i[\Sigma_j \varpi_{i,j}v_j-f_i]^2$ where $f_i$ is the input of row motions from optical flow estimation on each row, and $\Sigma_j \varpi_{i,j}v_j$ is the bi-linear weighted row motions within the time period for $f_i$.

For simplicity, omitting the index of p across frames in a sliding window, considering the least mean square error over-constrained optimizations within a frame, may result in a simplified objective function of:

$$\min(\text{Objective}) = \min(\Sigma_{Corr_j}\|MC(\text{Corr}_{k,j})\|^2 + \lambda\Sigma_j\|v_j - v_{j+1}\|^2),$$

where:

$$\Sigma_{Corr_j}\|MC(\text{Corr}_j)\|^2 = \Sigma_i[\Sigma_j \varpi_{i,j} v_j - f_i]^2$$

Taking the derivate and setting the equation to zero may result in an equation of:

$$\frac{d(\text{Objectvie})}{dv_k} =$$

$$2\sum_j \varpi_{k,j}\left[\sum_i \varpi_{i,j} V_i - f_j\right] + 2\lambda(v_k - v_{k+1}) - 2\lambda(v_{k-1} - v_k) = 0.$$

The items in the equation may be reordered to read:

$$\Sigma_j \varpi_{k,j} \Sigma_i \varpi_{i,j} v_i + \lambda(v_k - v_{k+1}) - \lambda(v_{k-1} - v_k) = \Sigma_j \varpi_{k,j} f_j.$$

A rolling shutter effect correction filter function may use the optimization framework for unknown row motions vector $\vec{v}$ in the form of a matrix for linear equations of $A \times \vec{v} = B$, where $B = \Sigma_j \varpi_{k,j} f_j$, V is the vector of unknown sub-sampled row motions from rolling shutter effect, and A is the optical flow correspondences with normal motions and unknown row motions related to V. Adding back the sliding window of multiple frames may expand matrix A, vector $\vec{v}$, and matrix B linearly, with more rows and unknowns. The rolling shutter effect correction filter may solve the over-constrained equation through conjugate gradient iterations, for all the unknowns in the sliding window. However, the rolling shutter effect correction filter may discard solutions on other frames and focus on the unknowns in the current center frame. After rolling shutter effect estimation, the rolling shutter effect correction filter may scale $v_i$ to the motion vector at the original resolution to establish the motion vector as:

$$\text{Row\_MV}_{rsc}[i] = v_i \times \rho,$$

where $\rho$ is a scaling factor between the original resolution and the down-sampled input.

The video processing system 300 may use a similarity motion transform model to act as a video stabilization filter. The motion transform model may have four unknown parameters, as described in the equation:

$$\begin{bmatrix} x' \\ y' \\ 1 \end{bmatrix} = \begin{bmatrix} s\cos\beta & s\sin\beta & t_x \\ -s\sin\beta & s\cos\beta & t_y \\ 0 & 0 & 1 \end{bmatrix} \cdot \begin{bmatrix} x \\ y \\ 1 \end{bmatrix} = G\begin{bmatrix} x \\ y \\ 1 \end{bmatrix},$$

where x and y are the original position; x' and y' are the transformed position; s is the scaling parameter; $\beta$ is the rotation parameter; $t_x$ and $t_y$ are translation parameters; and G is the 3×3 global motion transform matrix.

The video stabilization filter may execute similarity global motion estimation through a spatial global motion transform estimation and temporal smoothing. During spatial global motion transform estimation, the video stabilization filter may use $\tau$ motion vectors Flow[i,j] among the dense motion vectors from optical flow estimation for the spatial global motion estimation. The video stabilization filter may sub-sample motion vectors uniformly after excluding those on the frame borders. The video stabilization filter may estimate translation motion $(t_x, t_y)$, scaling factor s, and rotation $\beta$ separately first.

The video stabilization filter may estimate the global translation motion $(t_{xo}, t_{yo})$ as the average of all the input motion vectors from optical flow, represented by:

$$(t_{xo}, t_{yo}) = \frac{1}{\tau}\sum_i (\text{Flow}_x[i,j], \text{Flow}_y[i,j])$$

After the initial $(t_{xo}, t_{yo})$ is estimated, the video stabilization filter may estimate rotation $\beta$ and scaling factor s for each selected motion vector with an original position a certain distance to the frame center.

The video stabilization filter may choose a median of the estimated rotation array and estimated scaling factor array as the rotation parameter and scaling factor parameter for the frame. Then the video stabilization filter may select a set of motion vectors from the r motion vectors Flow[i,j], which match the estimation of translation $(t_{xo}, t_{yo})$, $\beta_m$, and $s_m$ within a certain error threshold $\in$. The mismatch error $\in$ is defined as, $$\in = (x_e - x - \text{Flow}_x[x,y])^2 + (y_e - y - \text{Flow}_y[x,y])^2$$

when $$\begin{bmatrix} x_e \\ y_e \\ 1 \end{bmatrix} = \begin{bmatrix} s_m\cos\beta_m & s\sin\beta_m & t_{xo}, \\ -s_m\sin\beta_m & s\cos\beta_m & t_{yo}, \\ 0 & 0 & 1 \end{bmatrix} \cdot \begin{bmatrix} x \\ y \\ 1 \end{bmatrix}.$$

Thus, the mismatch may be defined as the squared error between the estimated motion flow $(x_e - x, y_e - y)$ and the input motion flow Flow[i,j]. The video stabilization filter may select those motion vectors with mismatches below a set threshold for least mean square error refinement of the final spatial estimation for $s_s$, $\beta_s$ and $(t_{sx}, t_{sy})$.

After estimating a spatial global motion transform for each frame, the video stabilization filter may execute iterative temporal smoothing for $\theta$ iterations. The video stabilization filter may apply 2- or 3-tap filters to get stable global motions across frames in a sliding window, producing (1, 1) or (1, 2, 1) filters with normalization. Each successive iteration may use the output of previous iterations as input. The video stabilization filter may use a 2-tap filter of (1, 1) on the sliding window boundaries and a 3-tap filter of (1, 2, 1) for the other frames. Upon completing the iterations, the video stabilization filter may estimate the stable global motions as $s_{iter}$, $\beta_{itera}$ and $(t_{iter,x}, t_{iter,y})$. The video stabilization filter may apply the residual global motion in the frame correction for video stabilization, after stable global motion is subtracted from spatial global motion for each frame, as shown by the following equations:

$$s = s_s - s_{iter}$$

$$\beta = \beta_s - \beta_{iter}$$

$$(t_x, t_y) = (t_{sx}, t_{sy}) - (t_{iter,x}, t_{iter,y})$$

The image warping module 330 may apply the calculate corrections to the frame to remove the row motions Row_MV$_{rsc}$ and global motion transform of 3×3 matrix G to correct the skew, wobble, and shakiness in the initial version. The image warping module 330 may execute the global motion transform and row motion correction simultaneous with the backward mapping from target warped frame to the original frame. Specifically, as global motions G and the row motions Row_MV$_{rsc}$ are both estimated in the current coordinates instead of the warped coordinates, the image warping module 330 may execute a backward remapping process using the following equation:

$$\begin{bmatrix} x \\ y \\ 1 \end{bmatrix} = G^{-1} \begin{bmatrix} x' \\ y' \\ 1 \end{bmatrix}$$

First, the image warping module 330 may backward map the warped coordinates of $$\begin{bmatrix} x' \\ y' \\ 1 \end{bmatrix}$$

to the original coordinates of $$\begin{bmatrix} x \\ y \\ 1 \end{bmatrix}$$

by the inverse global motion transform of $G^{-1}$. Second, the image warping module 330 may compensate for the rolling shutter effect by correcting the row motion using the original coordinates of $$\begin{bmatrix} x \\ y \\ 1 \end{bmatrix},$$

as Row_MV$_{rsc}$ is estimated in the original coordinates according to the equation:

$$\begin{bmatrix} x_b \\ y_b \end{bmatrix} = \begin{bmatrix} x \\ y \end{bmatrix} + \text{Row\_MV}_{rsc}[y]$$

where $$\begin{bmatrix} x_b \\ y_b \end{bmatrix}$$

are the final coordinates of pixels after executing corrections for global motion and the rolling shutter effect.

The image warping module 330 may interpolate the row motion from Row_MV$_{rsc}$ as the estimated Row_MV$_{rsc}$ is sub-sampled, such that a subset of row motions in a frame are estimated. Then, the image warping module 330 may estimate the pixel value at $$\begin{bmatrix} x' \\ y' \end{bmatrix}$$

in warped coordinates from the floating position of $$\begin{bmatrix} x_b \\ y_b \end{bmatrix}$$

through bi-linear interpolation.

The image warping module 330 may zoom in or crop the image to avoid corruption of the four frame boundaries. Alternately, the image warping module 330 may black out the four frame boundaries.

Additionally, the video processing system 300 may cache the results of rolling shutter effect correction filter and the video stabilization filter for each parameter set chosen by the user. The user may select one or more parameters for the rolling shutter effect correction filter, such as a high filter level for video taken from a moving vehicle or a low filter level taken from a stationary position without a tripod. The user may compare a preview proxy set of the video data set to determine the filter level that produces the optimal result. A preview proxy is an interim version of the video data set prior to the final iteration of the filtering to produce the final version of the video data set. The caching of the preview proxy set may enable fast implementation of the filtering effect. The video processing system 300 may maintain a load status state machine to track a load state of the video data set.

FIG. 4 illustrates, in a block diagram, one embodiment of a version tracking system 400. The video processing system 300 may store various versions of the video data set in a cache 402. The cache 402 may be a central processing unit cache 222 or a graphical processing unit cache 232. The cache 402 may store an initial version 404 of the video data set. An initial version load status state machine 406 may track the loading status of the initial version 404. The load status state machine 406 may transition based on the actions of the video processing system 300 between states of loading, loaded, unloading, unloaded, notifying unloaded, load pending, notifying loaded, loading with unload, loading with reload, notifying loaded with unload, notifying loaded with reload, unloading with load, notifying unloaded with load, and other states.

As the video processing system 300 creates a preview proxy 408 representing the video data set at an interim point in the correction process. The cache 402 may associate the preview proxy 408 with a proxy load status state machine 410 to track the loading status of the preview proxy 408. The cache may further associate the preview proxy 408 with a proxy filter parameter 412 of the rolling shutter effect correction filter. The proxy filter parameter 412 may be a low filter setting, a high filter setting, or even an off setting. The off setting may set the video processing system 300 so that no rolling shutter effect correction filter is applied.

Once the user has selected the preferred proxy filter parameter 412 for the video data set, the video processing system 300 may create a final version 414 of the video data set. The video processing system 300 may store the final version 414 in the cache 402. The cache 402 may associate the final version 414 with a final version load status state machine 416 to track the loading status of the final version 414. The cache 402 may further associate the final version 414 with a final version filter parameter 418 of the rolling shutter effect correction filter.

Figure 5:
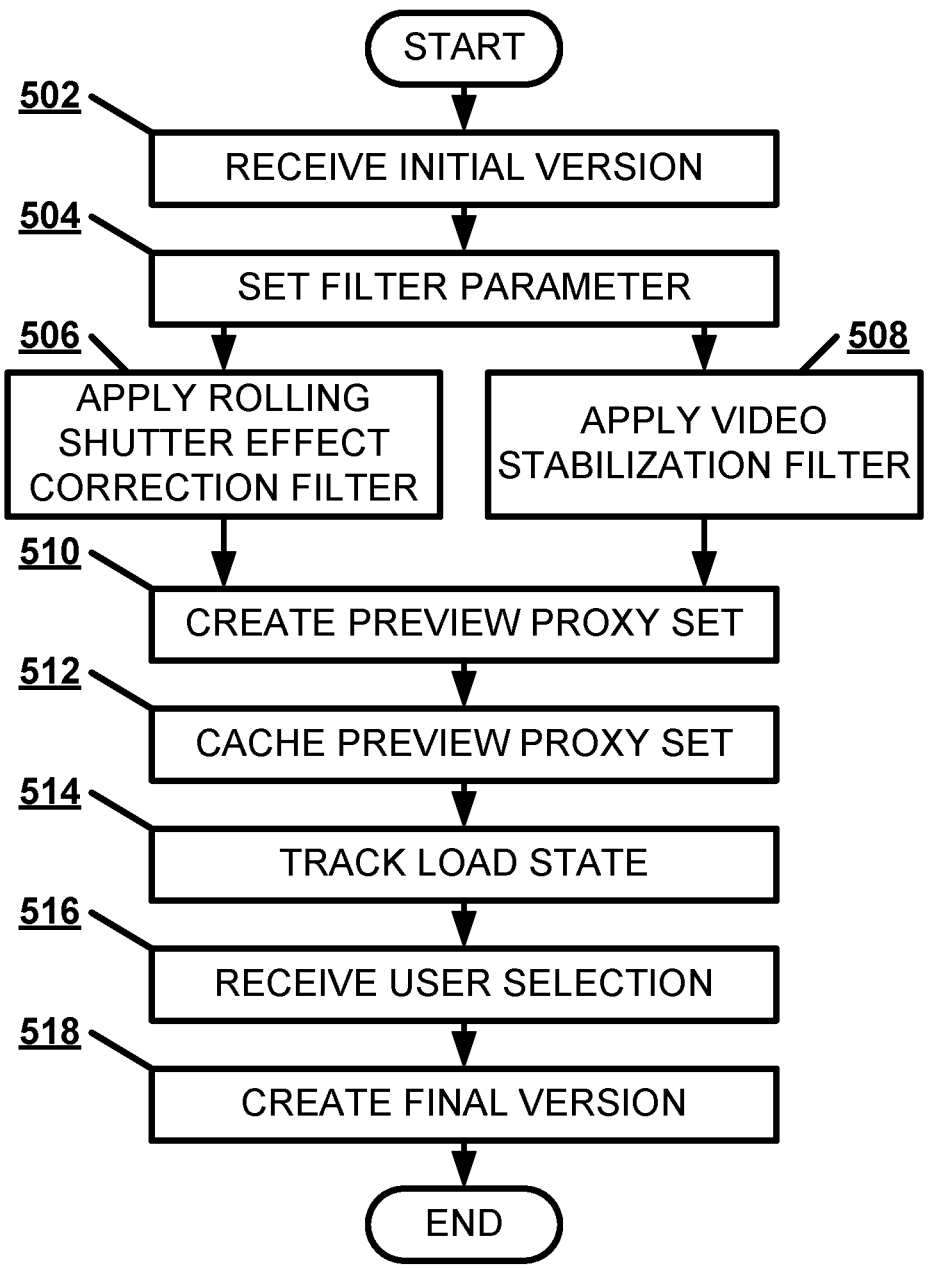
FIG. 5 illustrates, in a flowchart, one embodiment of a method to compare filtering of a video data set.

FIG. 5 illustrates, in a flowchart, one embodiment of a method 500 to compare filtering of a video data set. The video processing system 300 may receive an initial version of the video data set (Block 502). The video processing system 300 may receive the video data set from a data storage 250, a network interface 280, or a peripherals interface 290. The video processing system 300 may set a filter parameter for a rolling shutter effect correction filter (Block 504). The filter parameter may be a low level rolling shutter effect correction or a high level rolling shutter effect correction. The video processing system 300 may apply a rolling shutter effect correction filter to the initial version of the video data set (Block 506). The video processing system 300 may simultaneously apply a video stabilization filter to the initial version to eventually produce a final version of the video data set (Block 508). The video processing system 300 may create a preview proxy set of the video data set using the rolling shutter effect correction filter and the video stabilization filter (Block 510). The video processing system 300 may cache the preview proxy set of the video data set in the central processing unit cache 222 (Block 512). The video processing system 300 may track a load state of the video data set using a load status state machine (Block 514). The video processing system 300 may receive a user selection of a preview proxy of the preview proxy set (Block 516). The video processing system 300 may create a final version based on the user selection (Block 518).

Figure 6:
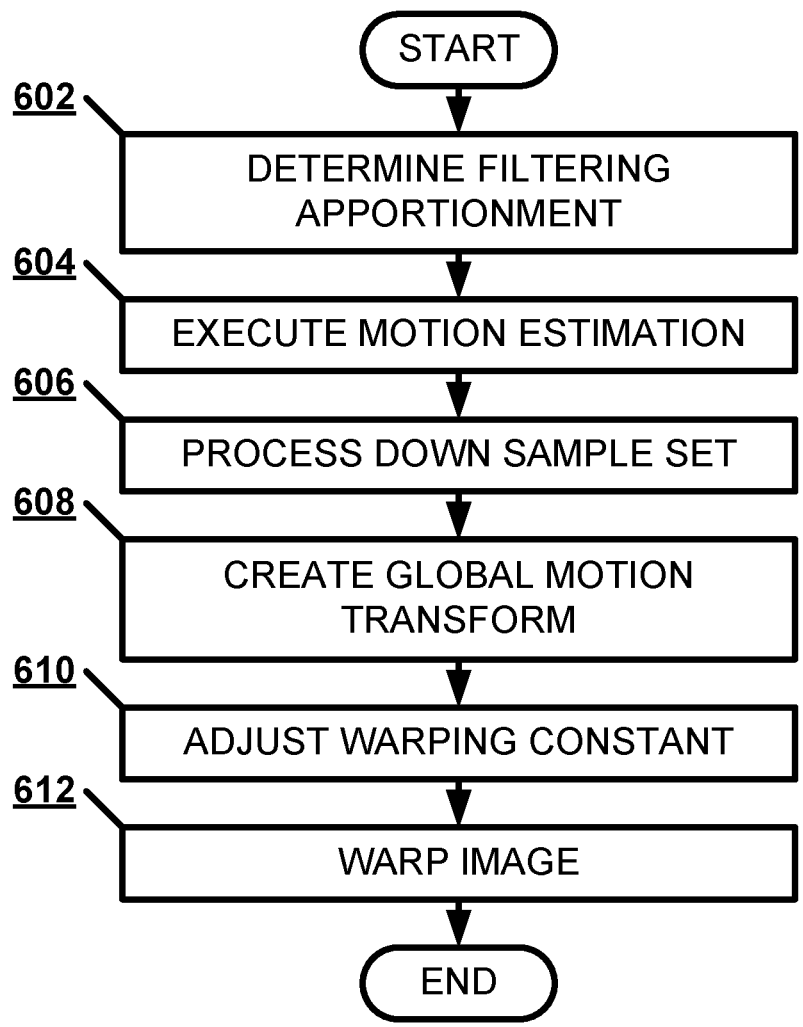
FIG. 6 illustrates, in a flowchart, one embodiment of a method to filter a video data set.

FIG. 6 illustrates, in a flowchart, one embodiment of a method 600 to apply a rolling shutter effect correction filter and a video stabilization filter to a video data set. The video processing system 300 may determine a filtering apportionment between a graphical processing unit 230 and a central processing unit 220 based on a prior filter performance (Block 602). The filtering apportionment describes which filtering tasks are performed by the central processing unit 220 and which filtering tasks are performed by the graphical processing unit 230. The video processing system 300 may execute a motion estimation on the initial version using the graphical processing unit 230 to create a down sample set (Block 604). The video processing system 300 may process the down sample set of the initial version using the central processor unit 220 to create a motion vector set having at least one row motion vector (Block 606). The video processing system 300 may create at least one global motion transform in the motion vector set from the at least one row motion vector using the central processor unit 220 (Block 608). Thus, the row motion vectors may be embedded in the backward mapping of the global motion transform. The video processing system 300 may adjust a warping constant on the motion vector set based on a previous iteration (Block 610). The video processing system 300 may warp an image of the initial version by applying the motion vector set of global motion transform and row motions using the graphical processing unit 230 (Block 612).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include non-transitory computer-readable storage media for carrying or having computer-executable instructions or data structures stored thereon. Such non-transitory computer-readable storage media may be any available media that can be accessed by a general purpose or special purpose computer. By way of example, and not limitation, such non-transitory computer-readable storage media can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:
1. A machine-implemented method, comprising:
determining, at a central processing unit, a filtering apportionment between a graphical processing unit and the central processing unit based on a prior filter performance, wherein the filtering apportionment distributes a first filtering task to the central processing unit and distributes a second filtering task to the graphical processing unit;
applying, as the first filtering task by the central processing unit, a rolling shutter effect correction filter to an initial version of a video data set; and
simultaneously to the central processing unit applying the rolling shutter effect correction filter, applying, as the second filtering task by the graphical processing unit, a video stabilization filter to the initial version of the video data set to produce a final version of the video data set.

2. The method of claim 1, further comprising:
executing a motion estimation on the initial version using the graphical processing unit to create a down sample set.

3. The method of claim 1, further comprising:
processing a down sample set of the initial version using the central processing unit to create a motion vector set.

4. The method of claim 1, further comprising:
warping an image of the initial version by applying a motion vector set using the graphical processing unit.

5. The method of claim 4, further comprising:
adjusting a warping constant on the motion vector set based on a previous iteration.

6. The method of claim 1, further comprising:
creating a preview proxy of the video data set using the rolling shutter effect correction filter and the video stabilization filter.

7. The method of claim 1, further comprising:
caching a preview proxy set of the video data set.

8. The method of claim 1, further comprising:
receiving a user selection of a preview proxy of a preview proxy set; and
creating the final version based on the user selection.

9. The method of claim 1, further comprising:
setting a filter parameter for the rolling shutter effect correction filter.

10. The method of claim 1, further comprising:
tracking a load state of the video data set using a load status state machine.

11. A tangible machine-readable medium having a set of instructions detailing a method stored thereon that when executed by one or more processors cause the one or more processors to perform the method, the method comprising:
determining a filtering apportionment between a graphical processing unit and a central processing unit based on a prior filter performance, wherein the filtering apportionment distributes a first filtering task to the central processing unit and distributes a second filtering task to the graphical processing unit;
applying, as the first filtering task by the central processing unit, a rolling shutter effect correction filter to an initial version of a video data set;
simultaneously to the central processing unit applying the rolling shutter effect correction filter, applying, as the second filtering task by the graphical processing unit, a video stabilization filter to the initial version of the video data set to produce a final version video data set;
creating a preview proxy set of the video data set using the rolling shutter effect correction filter and the video stabilization filter; and
caching the preview proxy set of the video data set.

12. The tangible machine-readable medium of claim 11, wherein the method further comprises:
executing a motion estimation on the initial version using the graphical processing unit to create a down sample set.

13. The tangible machine-readable medium of claim 11, wherein the method further comprises:
processing a down sample set of the initial version using the central processing unit to create a motion vector set having at least one row motion vector.

14. The tangible machine-readable medium of claim 13, wherein the method further comprises:
creating at least one global motion transform from the at least one row motion vector.

15. The tangible machine-readable medium of claim 11, wherein the method further comprises:
warping an image of the initial version by applying a motion vector set using the graphical processing unit.

16. The tangible machine-readable medium of claim 11, wherein the method further comprises:
setting a filter parameter for the rolling shutter effect correction filter.

17. The tangible machine-readable medium of claim 11, wherein the method further comprises:
receiving a user selection of a preview proxy of the preview proxy set; and
creating the final version based on the user selection.

18. A video processing system, comprising:
a central processing unit that determines a filtering apportionment between a graphical processing unit and the central processing unit based on a prior filter performance, wherein the filtering apportionment distributes a first filtering task to the central processing unit and distributes a second filtering task to the graphical processing unit, that applies, as the first filtering task, a rolling shutter effect correction filter to an initial version of a video data set, and determines a motion vector set for the initial version of a video data set from a down sample set; and
the graphical processing unit, that simultaneously to the central processing unit applying the rolling shutter effect correction filter, applies as the second filtering task, a video stabilization filter to the initial version, and that creates the down sample set from the initial version and warps the initial version to create a final version of the video data set by correcting skew and wobble in the initial version.

19. The video processing system of claim 18, further comprising:
a cache that stores a preview proxy set of the video data set.

* * * * *